Patented Oct. 24, 1944

2,360,896

UNITED STATES PATENT OFFICE 2,360,896

SOFTENERS FOR SYNTHETIC RUBBER

Donald V. Sarbach, Cuyahoga Falls, Ohio, assignor to The B. F. Goodrich Company, New York, N. Y., a corporation of New York No Drawing. Application August 28, 1941,
Serial No. 408,660

9 Claims. (Cl. 260—36)

This invention relates to a new class of softeners for synthetic rubber and to the improved compositions obtainable by the use of such softeners.

In comparison to natural rubber, synthetic rubber is relatively hard, dry and non-tacky and, unlike natural rubber, is incapable of being masticated to a soft plastic condition in which it may readily be compounded and processed. Accordingly, it is necessary to employ softeners or plasticizers in order to improve its compounding and processing characteristics. The selection of suitable softeners for synthetic rubber has, however, presented numerous difficulties, particularly in the case of synthetic rubber of the type prepared by the copolymerization of a butadiene-1,3 hydrocarbon and an acrylic nitrile. These difficulties are accentuated by the fact that many softeners ordinarily employed in rubbery and resinous materials are absolutely incompatible with this and other types of synthetic rubber and by the further fact that softeners for one type of synthetic rubber do not in all cases function similarly in other types of synthetic rubber. Even varying the proportions of the monomers in the mixtures employed to form copolymers often necessitates the search for new softeners for the synthetic rubber product. Aside from these difficulties, some softeners which are compatible with synthetic rubber so adversely affect the properties of vulcanizates prepared from compositions containing them as to preclude their use.

I have now discovered a new class of softeners which are compatible with any of the synthetic rubbers prepared by the polymerization of a butadiene hydrocarbon either alone or in admixture with other polymerizable compounds. Moreover, these new softeners impart to synthetic rubber certain desirable properties which do not ordinarily accompany the use of softeners and which heretofore have been difficult to obtain.

This new class of softeners may be defined chemically as esters of 6 to 10 carbon atom aliphatic tricarboxylic acids wherein the hydrogen atom of at least one carboxy group is replaced by the radical of a monohydric alcohol. Coming within this class of compounds are the esters of the saturated aliphatic tricarboxylic acids containing from 6 to 10 carbon atoms, inclusive, such as tricarballylic acid, alpha methyl tricarballylic acid, 1-2-3 butane tricarboxylic acid, camphoronic acid and the like, and the esters of unsaturated aliphatic tricarboxylic acids containing from 6 to 10 carbon atoms inclusive such as aconitic acid (1-2-3 propene tricarboxylic acid) isoaconitic acid, alpha-methyl aconitic acid, alpha-gamma-dimethyl aconitic acid, 2-butene 1-3-4 tricarboxylic acid, 2-pentene 2-3-5 tricarboxylic acid and the like. Esters of tricarboxylic acids containing other functional substituents such as hydroxy or amino groups, for example, esters of citric acid are, however, not included in this class of compounds. The alcohol residue contained in the esters coming within this class may be the radical of any monohydric alcohol including the aliphatic monohydric alcohols such as ethyl, propyl, isopropyl, n-butyl, tert butyl, n-amyl, active amyl, n-heptyl, n-octyl, lauryl and myristyl alcohols, tertiary butyl carbinol, methyl isopropyl carbinol and the like; the aromatic monohydric alcohols such as benzyl alcohol and the cyclic alcohols such as cyclohexanol, the various terpene alcohols and the like. Esters formed from aliphatic tricarboxylic acids and ether alcohols represented by the formula R—O—R$^1$—OH where R represents a monovalent organic radical and R$^1$ represents a divalent organic radical such as the ether ethanols like ethoxy ethanol and butoxy-ethanol may also be used.

The softeners of this invention may be esters in which only one or two of the three carboxyl groups in the tricarboxylic acid are esterified with a monohydric alcohol, or all three carboxyl groups may be so esterified. Moreover, the hydrogen atoms of the carboxyl groups may be replaced with the same or different monohydric alcohol radicals. Thus acid esters, mixed esters and neutral esters prepared from tricarboxylic acids having from 6 to 10 carbon atoms, inclusive, and monohydric alcohols are all included as softeners in this invention. Since aconitic acid and tricarballylic acid are more readily obtainable, esters prepared from these acids are preferred. Esters of such acids in which all three of the carboxyl groups are esterified with a monohydric alcohol containing from 2-8 carbon atoms and especially the esters in which the alcohol radical is an alkyl radical containing from two to six carbon atoms are particularly effective as softeners for synthetic rubber.

As mentioned hereinabove, these esters may be employed as softeners for synthetic rubber prepared by the polymerization of a butadiene-1,3 hydrocarbon, by which is meant, butadiene-1,3 and its homologs which polymerize in essentially the same manner such as isoprene, 2-3 dimethyl butadiene-1,3, piperylene and the like, either alone or in admixture with each other or with other unsaturated monomers copolymerizable therewith. Among such unsaturated monomers copolymerizable with a butadiene hydrocarbon to form synthetic rubber, there may be mentioned the aryl olefins such as styrene, vinyl naphthalene and the like, the alpha methylene carboxylic acids, esters and nitriles such as acrylic acid, methyl acrylate, methyl methacrylate, acrylonitrile, methacrylonitrile and the like; isobutylene, methyl vinyl ether, vinylidene chloride, methyl vinyl ketone and other unsaturated hydrocarbons, esters, alcohols, ketones, acids, ethers, etc., which contain the polymerizable structure

where at least one of the disconnected valencies is attached to an electro-active group, that is, a group which substantially increases the electrical dissymmetry or polar character of the molecule. The polymerization to form a synthetic rubber may be effected by any of the well-known methods known to the art such as homogeneous polymerization, polymerization in aqueous emulsion, etc.

The incorporation of the softener with the synthetic rubber may be effected by any desired method as by adding the softener to synthetic rubber while the rubber is being worked on a roll mill, masticating a mixture of rubber and softener in an internal mixer, or adding the softener to a solution or dispersion of the synthetic rubber. The amount of the softener added will depend upon the properties desired in the composition and upon the nature of the rubber treated; the rubber and the softener being compatible over a wide range of proportions. In commercial operations it will ordinarily be expedient to employ from about 10 to 60 parts by weight of the softener for each 100 parts by weight of synthetic rubber, but amounts smaller or larger than this are also effective. With synthetic rubber prepared by the copolymerization of butadiene and styrene or of butadiene and an acrylic ester, it is usually possible to use smaller amounts of softener than are required with rubber prepared by the copolymerization of butadiene and acrylonitrile.

In one embodiment of this invention, a synthetic rubber composition containing one of the softeners herein disclosed is prepared as follows: A batch consisting of 100 parts by weight of a synthetic rubber prepared by copolymerizing in aqueous emulsion 55 parts of butadiene and 45 parts of acrylonitrile is broken down on a roll mill at 120–130° F. 50 parts of tributyl aconitate is then added as fast as the softener is absorbed by the copolymer, this addition requiring about 20 minutes. Milling is extremely difficult at first, but as the softener is added the workability improves until at the end of the addition a soft, plastic, freely flowable finished batch is obtained. The conventional pigments, sulfur and a vulcanization accelerator are then added all of which are easily dispersed in the softened composition. The resulting unvulcanized composition is soft, plastic and moderately tacky. It may be subjected to the ordinary processing operations such as molding, calendering and extruding in the same easy manner as may softened natural rubber compositions. The unvulcanized composition possesses another outstanding property in that it remains soft and plastic at very low temperatures, the freezing point of this composition being lower than a pure gum stock and much lower than that of stocks containing any of the ordinary softeners.

When the above composition is vulcanized, a vulcanizate having excellent tensile strength and elongation is produced. The vulcanized composition is also remarkably resistant to low temperatures, remaining soft and flexible at temperatures as low as −60° C. and it possesses a low durometer hardness both of which properties render it particularly useful in many specialized applications. This combination of desirable properties in both unvulcanized and vulcanized compositions has heretofore been extremely difficult to obtain since many of the known softeners do not produce a tacky unvulcanized stock, others do not yield vulcanizates of desirable physical properties and none of the known softeners impart the exceptionally low temperature flexibility possessed by the compositions containing the softeners of this invention.

Other embodiments of this invention in which other synthetic rubbers are softened with other esters of tricarboxylic acids show that the same desirable results described above may be obtained. For example, triamyl aconitate, tricyclohexyl aconitate, tribenzyl aconitate, dibutyl propyl aconitate, triethyl carballylate and tributyl carballylate may be employed as softeners for butadiene acrylonitrile copolyers, butadiene styrene copolymers and butadiene methyl methacrylate copolymers with good results.

Other materials such as natural rubber, other softeners, pigments, fillers, vulcanizing agents, accelerators, antioxidants and the like may be included in the compositions herein described. Other modifications will be apparent to those skilled in the art and are within the spirit and scope of the invention as defined by the appended claims.

I claim:

1. A composition of matter comprising a synthetic rubber prepared by copolymerizing in aqueous emulsion butadiene-1,3 and acrylonitrile, and as a softener therefor, an ester of aconitic acid with a monohydric alcohol containing from 2 to 8 carbon atoms.

2. A composition of matter comprising a synthetic rubber prepared by copolymerizing in aqueous emulsion butadiene-1,3 and acrylonitrile and, as a softener therefor, a trialkyl aconitate in which each alkyl group contains from 2 to 8 carbon atoms.

3. A composition of matter comprising a synthetic rubber prepared by copolymerizing in aqueous emulsion butadiene-1,3 and acrylonitrile and, as a softener therefor, tributyl aconitate.

4. A composition of matter comprising a synthetic rubber prepared by copolymerizing in aqueous emulsion butadiene-1,3 and styrene and, as a softener therefor, an ester of aconitic acid with a monohydric alcohol containing from 2 to 8 carbon atoms.

5. A composition of matter comprising a synthetic rubber prepared by copolymerizing in aqueous emulsion butadiene-1,3 and styrene and, as a softener therefor, tributyl aconitate.

6. A composition of matter comprising a synthetic rubber prepared by copolymerizing in aqueous emulsion butadiene-1,3 and methyl methacrylate and, as a softener therefor, an ester of aconitic acid with a monohydric alcohol containing from 2 to 8 carbon atoms.

7. A composition of matter comprising a synthetic rubber prepared by copolymerizing in aqueous emulsion butadiene-1,3 and methyl methacrylate and, as a softener therefor, tributyl aconitate.

8. A composition of matter comprising a synthetic rubber prepared by copolymerizing a butadiene-1,3 hydrocarbon and another unsaturated compound which contains a

group and is copolymerizable therewith, and, as a softener therefor, an ester of aconitic acid with a monohydric alcohol containing from 2 to 8 carbon atoms.

9. A composition of matter prepared by vulcanizing a composition comprising a synthetic rubber prepared by copolymerizing a butadiene-1,3 hydrocarbon and another unsaturated compound which contains a

group and is copolymerizable therewith, and, as a softener therefor, an ester of aconitic acid with a monohydric alcohol containing from 2 to 8 carbon atoms.

DONALD V. SARBACH.